United States Patent
Baeder

(10) Patent No.: US 10,039,105 B1
(45) Date of Patent: Jul. 31, 2018

(54) SPECTRUM MONITORING APPARATUS, SPECTRUM ACCESS VERIFICATION SYSTEM AND METHOD FOR VERIFICATION OF SPECTRUM ACCESS RIGHTS

(71) Applicant: Rohde & Schwarz GmbH & Co. KG, München (DE)

(72) Inventor: Uwe Baeder, Erding (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 15/657,116

(22) Filed: Jul. 22, 2017

(51) Int. Cl.
*H04W 72/00* (2009.01)
*H04W 72/04* (2009.01)
*H04W 64/00* (2009.01)
*H04W 16/14* (2009.01)

(52) U.S. Cl.
CPC ....... *H04W 72/0453* (2013.01); *H04W 16/14* (2013.01); *H04W 64/003* (2013.01)

(58) Field of Classification Search
CPC ............. H04W 72/0453; H04W 16/14; H04W 64/003
See application file for complete search history.

(56) References Cited

U.S. PATENT DOCUMENTS

| | | | |
|---|---|---|---|
| 2015/0350453 A1* | 12/2015 | Solondz | H04M 15/54 455/406 |
| 2016/0295571 A1* | 10/2016 | Garnett | H04W 64/00 |
| 2017/0251055 A1* | 8/2017 | Edge | H04L 67/1044 |

* cited by examiner

*Primary Examiner* — Wayne H Cai
(74) *Attorney, Agent, or Firm* — Westman, Champlin & Koehler, P.A.

(57) ABSTRACT

Amongst others, a spectrum monitoring apparatus is disclosed. In some embodiments, a spectrum monitoring apparatus includes a radio-frequency (RF) receiver, an RF decoder, a query interface coupled to a spectrum access right database, a processor, and an access right determination module. The RF receiver is configured to receive radio frequency signals of an operator of a radio communication system utilizing frequencies of a monitored spectrum. The RF decoder is configured to decode radio frequency signals received by the RF receiver and to determine an identity of the operator. The processor is configured to send an operator query to the spectrum access right database via the query interface, the operator query containing the determined identity of the operator. The access right determination module is configured to receive a response from the spectrum access right database to the operator query via the query interface and to determine, on the basis of the determined identity of the operator and the response, whether the operator of the RF communication system is licensed to utilize the monitored frequencies.

17 Claims, 1 Drawing Sheet

SPECTRUM MONITORING APPARATUS, SPECTRUM ACCESS VERIFICATION SYSTEM AND METHOD FOR VERIFICATION OF SPECTRUM ACCESS RIGHTS

FIELD OF THE INVENTION

The present invention relates to spectrum monitoring apparatuses, systems for verifying spectrum access rights and methods for verification of spectrum access rights. Such apparatuses, systems and methods may be employed particularly for licensed shared access (LSA) or shared access spectrum (SAS) concepts where temporarily free spectrum portions may be sub-licensed for deployed and monitored frequency use.

BACKGROUND OF THE INVENTION

Spectrum sharing technology is steadily gaining both attention and momentum within various regulatory bodies, standards groups such as ETSI and 3GPP and industry for a such as the Wireless Innovation Forum. Spectrum sharing technology is expected to be the leverage for regulators to increase $5^{th}$ Generation (5G) mobile applications capacity.

Sharing frameworks are established under the responsibility of the administration of a mobile network and need to at least identify incumbents and spectra to be made available under comprises (as a minimum) the identification of the incumbent the spectrum to be made available for sharing, and the corresponding conditions for shared spectrum access by both incumbent(s) and sub-licensee. Two major sharing framework approaches are currently pursued in order to enable spectrum sharing—Shared Access Spectrum (SAS) and Licensed Spectrum Access (LSA).

The Spectrum Access System (SAS) allows for the implementation of an advanced three-tier spectrum sharing framework adopted for the Citizens Broadband Radio Service (CBRS) by the Federal Communications Commission (FCC) of the United States of America. The three-tiered sharing framework coordinates spectrum access among incumbents such as military communication facilities, priority access licensees (PALs) such as satellite earth stations and commercial users with General Authorized Access (GAA). The SAS is an advanced, highly automated radio spectrum coordinator within the CBRS 3.5 GHz band, and is tasked with protecting the higher-tier users from lower-tier users and optimizing efficient use of the available spectrum in the band for all users. As a result, the 150 MHz of CBRS spectrum is dynamically shared. The SAS maintains a database of all CBRS radio base stations including their tier status, geographical location, and other pertinent information to coordinate frequency and transmit power assignments, and to monitor and protect the band from potential interference.

Licensed Spectrum Access (LSA) facilitates access for additional licensees in bands which are already in use by one or more incumbents. LSA is a concept to dynamically share this band, whenever and wherever it is unused by the incumbent users. Shared use of the spectrum is only allowed on the basis of an individual authorisation (i.e. licensed). LSA is a further development of an industry proposal for Authorised Shared Access (ASA) concept, with the potential for application to other services in addition to mobile broadband, for example wireless cameras or the Internet of Things (IoT).

LSA is defined within the framework of the European Union as a regulatory approach aiming to facilitate the introduction of radio communication systems operated by a limited number of licensees under an individual licensing regime in a frequency band already assigned or expected to be assigned to one or more incumbent users. Under the Licensed Shared Access (LSA) approach, the additional users are authorised to use the spectrum (or part of the spectrum) in accordance with sharing rules included in their rights of use of spectrum, thereby allowing all the authorised users, including incumbents, to provide a certain Quality of Service (QoS).

Depending on the nature of the use of the band by the incumbent, the sharing rules can be fixed or there may be a need to use a repository which holds actual information on the use of specific frequencies in a given area by the incumbent. Based on this information an LSA or SAS controller can give clearance to the LSA/SAS user to use certain frequencies in the shared band. This means that if LSA/SAS is used in a mobile network, there might be a need to extend the network with functionality to control spectrum access by the base stations within the shared band. Since the mobile devices are under control of the base stations, there is no need to have any added functionality in the mobile devices.

For example, the Spectrum Monitoring and Detection Directorate (SMDD) of the Bangladesh Telecommunication Regulatory Commission (BTRC) has implemented an Automated Spectrum Management System (ASMS) which enables the SMDD to manage licensed assignments and to enable compliance monitoring in wireless communication networks (http://www.btrc.gov.bd/print/558).

SUMMARY OF THE INVENTION

According to the disclosure of present invention spectrum monitoring apparatuses, systems for verifying spectrum access rights and methods for verification of spectrum access rights may be implemented. Such apparatuses, systems and methods may be employed for monitoring spectrum access in licensed shared access (LSA) or shared access spectrum (SAS) concepts where temporarily free spectrum portions may be sub-licensed for deployed frequency use.

Specifically, according to a first aspect of the invention, a spectrum monitoring apparatus includes a radio-frequency (RF) receiver, an RF decoder, a query interface coupled to a spectrum access right database, a processor, and an access right determination module. The RF receiver is configured to receive radio frequency signals of an operator of a radio communication system utilizing frequencies of a monitored spectrum. The RF decoder is configured to decode radio frequency signals received by the RF receiver and to determine an identity of the operator. The processor is configured to send an operator query to the spectrum access right database via the query interface, the operator query containing the determined identity of the operator. The access right determination module is configured to receive a response from the spectrum access right database to the operator query via the query interface and to determine, on the basis of the determined identity of the operator and the response, whether the operator of the RF communication system is licensed to utilize the monitored frequencies.

According to a second aspect of the invention, a method for verification of spectrum access rights includes receiving, by a radio-frequency (RF) receiver, radio frequency signals of an operator of an RF communication system utilizing one or more frequencies of a monitored spectrum, decoding, by an RF decoder, radio frequency signals received by the RF receiver, determining an identity of the operator of the RF communication system on the basis of the decoded radio frequency signals, sending, by a processor, an operator query to a spectrum access right database, the operator query containing the determined identity of the operator of the RF communication system, receiving a response from the spectrum access right database to the operator query, determining, by an access right determination module, whether the operator of the RF communication system is licensed to utilize the one or more frequencies of the monitored spectrum on the basis of the determined identity of the operator of the RF communication system and the received response.

According to a third aspect of the invention, a spectrum access verification system includes a spectrum monitoring apparatus comprising a radio-frequency (RF) receiver configured to receive radio frequency signals of an operator of an RF communication system utilizing one or more frequencies of a monitored spectrum, an RF decoder operatively coupled to the RF receiver, the RF decoder being configured to decode radio frequency signals received by the RF receiver and to determine an identity of the operator of the RF communication system, a processor operatively coupled to the RF decoder, and an access right determination module. The spectrum access verification system further includes a spectrum access right database coupled to an interface of the spectrum monitoring apparatus. The processor is configured to send an operator query to the spectrum access right database, the operator query containing the determined identity of the operator of the RF communication system. The access right determination module is configured to receive a response from the spectrum access right database to the operator query and to determine, on the basis of the determined identity of the operator of the RF communication system and the response, whether the operator of the RF communication system is licensed to utilize the one or more frequencies of the monitored spectrum.

One idea of the present invention is to combine spectrum monitoring functionality with advanced radio demodulation techniques in order to identify the operator of a communication system using frequencies of a monitored spectrum. The information gained in this manner is then used to query a dynamic spectrum access database and to verify—based on the response to the query—whether the identified operator is currently licensed to use the portion of the monitored spectrum.

The verification process may advantageously be highly dynamic in nature and may be location-based depending on the site of the spectrum monitoring. The measurements and analyses may be performed in accordance with the ITU spectrum monitoring recommendations to continuously and automatically monitor even large scale networks.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the accompanying drawings. Elements in the drawings are illustrated for simplicity and clarity and have not necessarily been drawn to scale.

In all figures of the drawings elements, features and components which are the same or at least have the same functionality have been provided with the same reference symbols, unless explicitly stated otherwise.

DETAILED DESCRIPTION OF THE EMBODIMENTS

Figure 1:
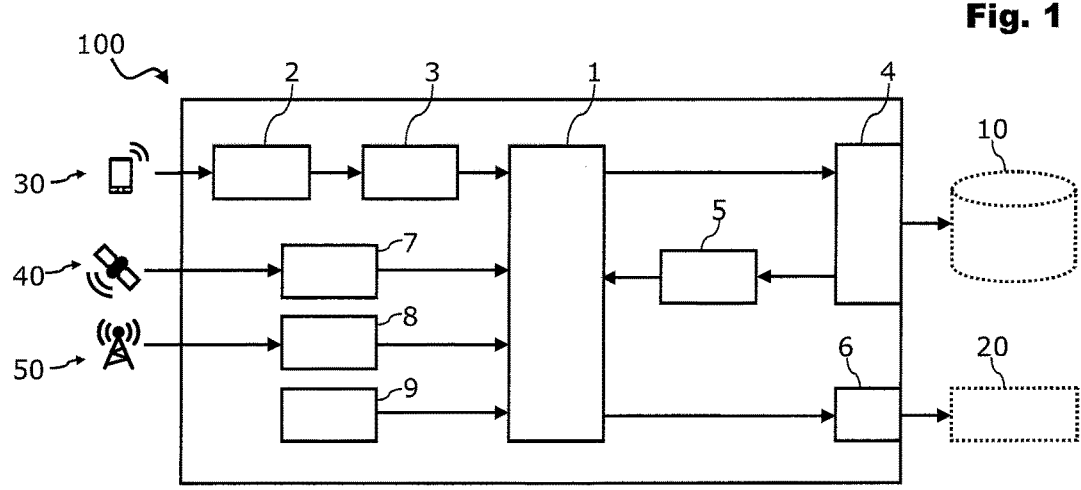
FIG. 1 schematically illustrates a spectrum monitoring apparatus according to an embodiment of the invention.

FIG. 1 schematically illustrates a spectrum monitoring apparatus 100. The spectrum monitoring apparatus 100 may be employed to perform spectrum monitoring of a given radio frequency (RF) spectrum, such as a 3.5 GHz spectrum, and is configured to identify an operator of a radio communication system using frequencies of the given RF spectrum by means of RF decoding and demodulation schemes. Specifically, the spectrum monitoring apparatus 100 may be used to verify whether identified operators of radio communication systems using frequencies of the given RF spectrum are currently licensed under a spectrum sharing framework including those frequencies.

Figure 2:
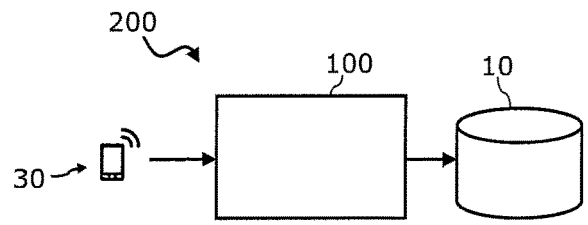
FIG. 2 schematically illustrates a spectrum access verification system according to another embodiment of the invention.

The spectrum monitoring apparatus 100 as illustrated in FIG. 1 may be employed in a spectrum access verification system, such as the spectrum access verification system 200 of FIG. 2.

Referring to FIG. 1, the spectrum monitoring apparatus 100 comprises a radio-frequency (RF) receiver 2 configured to receive radio frequency signals of an operator of an RF communication system 30 utilizing one or more frequencies of a monitored spectrum. The RF receiver 2 is operatively coupled to an RF decoder 3 that decodes radio frequency signals received by the RF receiver 2. The content of the decoded radio frequency signals is used to determine an identity of the operator of the RF communication system 30 by the RF decoder 3. It may alternatively also be possible to determine the identity of the operator of the RF communication system 30 by the processor 1 coupled downstream to the RF decoder 3. In that case, the RF decoder 3 merely sends the decoded radio frequency signals for further processing to the processor 1. The RF decoder may be configured to decode all sorts of RF signals, depending on the desired spectra to be monitored. For example, the RF decode may decode and evaluate LTE signals, WiFi signals, Bluetooth® signals, amplitude modulated signals, frequency modulated signals, fixed satellite signals, dynamic stationary mobile radio communication signals, stationary mobile dynamic radio communication signals, mobile stationary dynamic radio communication signals or aeronautical radio navigation signals.

The spectrum monitoring apparatus 100 further includes a processor 1 operatively coupled to the RF decoder 3, and a query interface 4 coupled to a spectrum access right database 10. The spectrum access right database 10 may for example be a licensed shared access (LSA) database or a shared access spectrum (SAS) database in which identities of verified licensees of frequencies in shared spectra are dynamically stored. The LSA or SAS database 10 may be managed and its contents dynamically updated, for example by an external licensing agreement management program that negotiates licenses with operators of radio communication systems for shared access to frequencies of shared spectra.

The processor 1 sends operator queries to the spectrum access right database 10 via the query interface 4. Such operator queries contain the determined identity of the operator of the RF communication system 30 in the monitored spectrum. The spectrum access right database 10 receives those operator queries and responds accordingly to the processor 1 via the query interface 4. Those responses are received by an access right determination module 5 operatively coupled to the query interface 4. The access right determination module 5 evaluates the responses from the spectrum access right database 10 by comparing, on the basis of the determined identity of the operator of the RF communication system 30 and the contents of the response, whether the operator of the RF communication system 30 is licensed to utilize the one or more frequencies of the monitored spectrum which he has been found using by spectrum monitoring apparatus 100.

The spectrum monitoring apparatus 100 may further comprise one or more additional components that aid in verifying shared access spectrum licensees among the determined operators. For example, the spectrum monitoring apparatus 100 may further comprise a global navigation satellite system module 7 configured to determine a global location of the spectrum monitoring apparatus 100, for example by receiving triangulation data from global positioning satellites 40. The spectrum monitoring apparatus 100 may further comprise an eNodeB localisation unit 8 configured to localise an eNodeB 50 over which the operator of the RF communication system 30 connects to an LTE backbone. Additionally, the spectrum monitoring apparatus 100 may further comprise an evaluation unit 9 that is used to evaluate, amongst others, RF signals, operator queries, responses to operator queries, signals sent and received by components of the spectrum monitoring apparatus 100 and the like.

The access right determination module 5 may for example take into account one or more information items as determined or gathered by the additional components 7, 8, 9. For example, the access right determination module 5 may be configured to further determine whether the operator of the RF communication system 30 is licensed to utilize the one or more frequencies of the monitored spectrum on the basis of a global location of the spectrum monitoring apparatus 100 as determined by the global navigation satellite system module 7.

FIG. 2 depicts a spectrum access verification system 200 that includes a spectrum monitoring apparatus and a spectrum access right database 10. The spectrum monitoring apparatus of the spectrum access verification system 200 in FIG. 2 may for example be implemented according to the spectrum monitoring apparatus 100 as illustrated in and explained in conjunction with FIG. 1.

The functionality of the spectrum monitoring apparatus 100 and the spectrum access verification system 200 in operation will be explained in conjunction with the method M for verification of spectrum access rights, a flowchart of which is exemplarily depicted in FIG. 3, while resorting to the examples of FIGS. 1 and 2 for a better understanding of the underlying principles.

Figure 3:
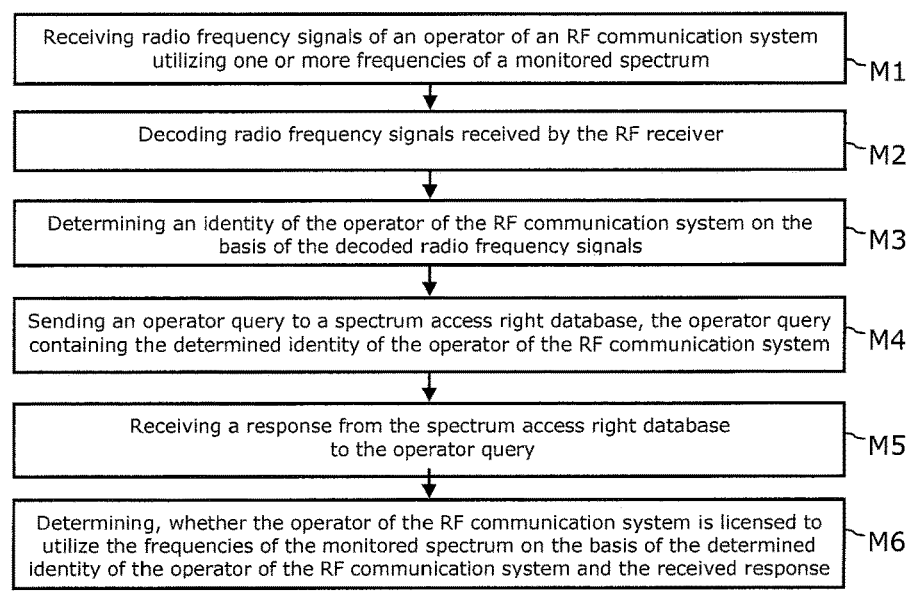
FIG. 3 shows a flowchart of procedural stages of a method for verification of spectrum access rights according to a further embodiment of the invention.

FIG. 3 schematically illustrates procedural stages of a method M for verification of spectrum access rights. The method M may be performed using the spectrum monitoring apparatus 100 of FIG. 1.

In the method M, at M1 a radio-frequency (RF) receiver receives radio frequency signals of an operator of an RF communication system utilizing one or more frequencies of a monitored spectrum. At M2, those radio frequency signals received by the RF receiver are decoded by an RF decoder. The RF decoder may for example be configured to decode all sorts of RF signals, including but not limited to LTE signals, WiFi signals, Bluetooth® signals, amplitude modulated signals, frequency modulated signals, fixed satellite signals, dynamic stationary mobile radio communication signals, stationary mobile dynamic radio communication signals, mobile stationary dynamic radio communication signals or aeronautical radio navigation signals.

At M3, an identity of the operator of the RF communication system may be determined on the basis of the decoded radio frequency signals. At M4, an operator query containing the determined identity of the operator of the RF communication system is sent by a processor to a spectrum access right database. The spectrum access right database responds to the operator query by sending a response which is received at M5.

An access right determination module determines at M6, whether the operator of the RF communication system is licensed to utilize the one or more frequencies of the monitored spectrum. Such determination is performed on the basis of a comparison of the determined identity of the operator of the RF communication system with the contents of the received response from the spectrum access right database. The spectrum access right database may for example be a licensed shared access (LSA) database or a shared access spectrum (SAS) database.

Optionally, it may be possible in the method M to determine a global location of the spectrum monitoring apparatus, so that the determination whether the operator of the RF communication system is licensed to utilize the one or more frequencies of the monitored spectrum may further be performed on the basis of the determined global location of the spectrum monitoring apparatus.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections between various elements as shown and described with respect to the drawings may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware, but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device. Those skilled in the art will recognize that the boundaries between logic or functional blocks are merely illustrative and that alternative embodiments may merge logic or functional blocks or impose an alternate decomposition of functionality upon various logic or functional blocks.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that the illustrations of chosen elements in the drawings are only used to help to improve the understanding of the functionality and the arrangements of these elements in various embodiments of the present invention. Also, common and well understood elements that are useful or necessary in a commercially feasible embodiment are generally not depicted in the drawings in order to facilitate the understanding of the technical concept of these various embodiments of the present invention. It will further be appreciated that certain procedural stages in the described methods may be described or depicted in a particular order of occurrence while those skilled in the art will understand that such specificity with respect to sequence is not actually required.

What is claimed is:

1. A spectrum monitoring apparatus comprising:
   a radio-frequency (RF) receiver configured to receive radio frequency signals of an operator of an RF communication system utilizing one or more frequencies of a monitored spectrum;
   an RF decoder operatively coupled to the RF receiver, the RF decoder being configured to decode radio frequency signals received by the RF receiver and to determine an identity of the operator of the RF communication system;
   a query interface coupled to a spectrum access right database;
   a processor operatively coupled to the RF decoder and the query interface, the processor being configured to send an operator query to the spectrum access right database via the query interface, the operator query containing the determined identity of the operator of the RF communication system; and
   an access right determination module operatively coupled to the query interface, the access right determination module being configured to receive a response from the spectrum access right database to the operator query via the query interface and to determine, on the basis of the determined identity of the operator of the RF communication system and the response, whether the operator of the RF communication system is licensed to utilize the one or more frequencies of the monitored spectrum.

2. The spectrum monitoring apparatus of claim 1, wherein the spectrum access right database is one of a licensed shared access database and a shared access spectrum database.

3. The spectrum monitoring apparatus of claim 1, further comprising:
   a global navigation satellite system module configured to determine a global location of the spectrum monitoring apparatus.

4. The spectrum monitoring apparatus of claim 3, wherein the access right determination module is configured to further determine whether the operator of the RF communication system is licensed to utilize the one or more frequencies of the monitored spectrum on the basis of a global location of the spectrum monitoring apparatus determined by the global navigation satellite system module.

5. The spectrum monitoring apparatus of claim 1, further comprising:
   an eNodeB localisation unit configured to localise an eNodeB.

6. The spectrum monitoring apparatus of claim 1, wherein the RF decoder is configured to decode at least one of LTE signals, WiFi signals, Bluetooth® signals, amplitude modulated signals, frequency modulated signals, fixed satellite signals, dynamic stationary mobile radio communication signals and aeronautical radio navigation signals.

7. A method for verification of spectrum access rights, the method comprising:
   receiving, by a radio-frequency (RF) receiver, radio frequency signals of an operator of an RF communication system utilizing one or more frequencies of a monitored spectrum;
   decoding, by an RF decoder, radio frequency signals received by the RF receiver;
   determining an identity of the operator of the RF communication system on the basis of the decoded radio frequency signals;
   sending, by a processor, an operator query to a spectrum access right database, the operator query containing the determined identity of the operator of the RF communication system;
   receiving a response from the spectrum access right database to the operator query; and
   determining, by an access right determination module, whether the operator of the RF communication system is licensed to utilize the one or more frequencies of the monitored spectrum on the basis of the determined identity of the operator of the RF communication system and the received response.

8. The method of claim 7, wherein the spectrum access right database is one of a licensed shared access database and a shared access spectrum database.

9. The method of claim 7, further comprising:
   determining a global location of the spectrum monitoring apparatus.

10. The method of claim 9, wherein determining whether the operator of the RF communication system is licensed to utilize the one or more frequencies of the monitored spectrum is further performed on the basis of the determined global location of the spectrum monitoring apparatus.

11. The method of claim 7, wherein the decoding includes decoding at least one of LTE signals, WiFi signals, Bluetooth® signals, amplitude modulated signals, frequency modulated signals, fixed satellite signals, stationary dynamic mobile radio communication signals and aeronautical radio navigation signals.

12. A spectrum access verification system comprising:
a spectrum monitoring apparatus comprising a radio-frequency (RF) receiver configured to receive radio frequency signals of an operator of an RF communication system utilizing one or more frequencies of a monitored spectrum, an RF decoder operatively coupled to the RF receiver, the RF decoder being configured to decode radio frequency signals received by the RF receiver and to determine an identity of the operator of the RF communication system, a processor operatively coupled to the RF decoder, and an access right determination module; and
a spectrum access right database coupled to an interface of the spectrum monitoring apparatus,
the processor being configured to send an operator query to the spectrum access right database, the operator query containing the determined identity of the operator of the RF communication system,
the access right determination module being configured to receive a response from the spectrum access right database to the operator query and to determine, on the basis of the determined identity of the operator of the RF communication system and the response, whether the operator of the RF communication system is licensed to utilize the one or more frequencies of the monitored spectrum.

13. The spectrum access verification system of claim 12, wherein the spectrum access right database is one of a licensed shared access database and a shared access spectrum database.

14. The spectrum access verification system of claim 12, wherein the spectrum monitoring apparatus further comprises a global navigation satellite system module configured to determine a global location of the spectrum monitoring apparatus.

15. The spectrum access verification system of claim 14, wherein the access right determination module is configured to further determine whether the operator of the RF communication system is licensed to utilize the one or more frequencies of the monitored spectrum on the basis of a global location of the spectrum monitoring apparatus determined by the global navigation satellite system module.

16. The spectrum access verification system of claim 12, wherein the spectrum monitoring apparatus further comprises an eNodeB localisation unit configured to localise an eNodeB.

17. The spectrum access verification system of claim 12, wherein the RF decoder is configured to decode at least one of LTE signals, WiFi signals, Bluetooth® signals, amplitude modulated signals, frequency modulated signals, fixed satellite signals, mobile stationary dynamic radio communication signals and aeronautical radio navigation signals.

* * * * *